United States Patent [19]

Chang

[11] Patent Number: 5,438,377
[45] Date of Patent: Aug. 1, 1995

[54] CHANNEL SELECTING APPARATUS AND A METHOD THEREOF

[75] Inventor: Shi H. Chang, Suwon, Rep. of Korea

[73] Assignee: SamSung Electronics Co., Ltd., Suwon, Rep. of Korea

[21] Appl. No.: 202,972

[22] Filed: Feb. 28, 1994

[30] Foreign Application Priority Data

Feb. 27, 1993 [KR] Rep. of Korea .................. 93-3012

[51] Int. Cl.⁶ .................. H04N 5/50; H04N 5/44
[52] U.S. Cl. .................. 348/731; 348/734; 455/186.2; 340/825.72; 341/175; 341/23; 341/176
[58] Field of Search .................. 348/734, 731; 364/709.16; 340/825.69, 825.72; 455/186.1, 186.2; 341/175, 20, 23, 26, 176; H04N 5/50, 5/44

[56] References Cited

U.S. PATENT DOCUMENTS

| | | |
|---|---|---|
| 3,943,451 | 3/1976 | Stoddard . |
| 3,973,205 | 8/1976 | Tanaka . |
| 3,973,207 | 8/1976 | Sugizaki . |
| 4,041,402 | 8/1977 | Mogi . |
| 4,258,426 | 3/1981 | Balzarini et al. . |
| 4,279,035 | 7/1981 | Skerlos . |
| 4,361,907 | 11/1982 | Wine . |
| 4,381,502 | 4/1983 | Prame ..................... 341/26 |
| 4,491,827 | 1/1985 | Sugiura et al. . |
| 4,651,342 | 3/1987 | Mengel . |
| 5,128,672 | 7/1992 | Kaehler ..................... 341/23 |
| 5,144,302 | 9/1992 | Carter et al. ................ 341/23 |
| 5,164,723 | 11/1992 | Nebenzahl ................. 341/23 |

FOREIGN PATENT DOCUMENTS

| | | | |
|---|---|---|---|
| 0352446 | 1/1990 | European Pat. Off. ........ 455/186 |
| 63-129715 | 6/1988 | Japan ............................ 341/176 |
| 2128005 | 4/1984 | United Kingdom ............ 341/23 |

Primary Examiner—James J. Groody
Assistant Examiner—N. N. West
Attorney, Agent, or Firm—Robert E. Bushnell

[57] ABSTRACT

A channel selector used in a television set, video cassette recorder and the like includes a key pad having tens key corresponding to the decimal numbers zero through nine. A microcomputer is also included therein, which is operated in response to the key pad output and controls on screen display circuit, a tuning voltage generator. A desired channel number is easily selected by the microcomputer which is operated by the program therein. As a result, a user may operate easily and quickly the channel selector without feeling a tedium due to a delay time between the activation of a first key and the activation of a second key.

15 Claims, 5 Drawing Sheets

CHANNEL SELECTING APPARATUS AND A METHOD THEREOF

CROSS-REFERENCE TO RELATED APPLICATIONS

This application makes reference to and claims all benefits arising under title 35 U.S.C. §119 of Applicant's earlier filing in The Korea Industrial Property Office on the 27th day of February 1993 of an application duly assigned Ser. No. 93-3012.

BACKGROUND OF THE INVENTION

1. Field of the Invention

The present invention relates to a channel selecting system, and more particularly, to a channel selecting apparatus and process capable of performing a "POWER-ON" function of a television (TV) set and at the same time, conveniently selecting a desired channel number, without experiencing delay required for the selection of a dual channel.

2. Description of the Art

Currently, channel selecting apparatus incorporated into electric appliances such as television sets, video cassette recorder sets and the like are constructed to simultaneously activate not only the "POWER-ON" function for the set, but to also perform the channel selecting function for the electric appliance. Especially, television sets incorporating a channel selector function are constructed to select the broadcast channel desired to be received by a viewer, by using a set of numeric keys having the tens' keys corresponding to the decimal numbers zero through nine, without an additional POWER-ON key, are widely used on the European continent. As can be understood from the following description, such sets are particularly inconvenient.

For example, when a television set is in its "POWER-OFF" mode, if one of the numeric keys which include the decimal numbers "zero" to "nine" is activated by a user, the TV set is consequently placed in its "POWER-ON" mode and simultaneously selects the channel broadcast being displayed on a cathode ray tube in order to permit the user to watch television.

In the above channel selecting apparatus however, in case that the channel of the broadcast channel selected by the user to watch is a two digit number, it has a disadvantage that the user must activate not only the first key which performs the "POWER-ON" function of the television set and at the same time selects the channel designated by that first key, but also the second key which belatedly selects the desired channel indicated by the two digits represented by the first and second keys only after performing activation of a single/dual channel selecting key which selects either the single channel mode or the dual channel mode.

Many new techniques have been proposed in order to address the problem described above. A representative example of these recently proposed techniques is described in, for example, *TV Channel Selector Assembly* by James C. Stoddard, U.S. Pat. No. 3,943,451. According to Stoddard '451, a television channel selector assembly is provided which is effective to select a channel by merely activating a key or keys corresponding to the number of the desired channel whereby no separate channel selecting control key is necessary. With such techniques however, there is unfortunately also a disadvantage of loss of program viewing time attendant upon the delay occurring between the first key activation and the second key activation, so that the user experiences some tedium.

SUMMARY OF THE INVENTION

It is therefore, one object of the present invention to provide an improved process and apparatus for initiating channel selection in a multi-channel appliance unit while turning on electrical power to the unit.

It is another object to provide a simplified process and circuit for applying electrical power to an appliance while accurately and simultaneously tuning the appliance to either a single digit or a two-digit broadcast channel with a minimum of key strokes.

It is yet another object to provide a channel selecting system able to select a desired channel number without experiencing a delay due to which channel is finally selected before the desired channel number is stored in a microcomputer and then turning off the power to the set.

It is still another object to provide a process and circuit for applying power to an appliance while accurately and simultaneously tuning the appliance to either a single digit or two digit broadcast channel without incurring delay in viewing time due to any intervening display of an undesired broadcast channel.

These and other objects may be achieved according to the principles of the present invention, with a channel selecting system using a key pad having ten keys each of which corresponds to one of the decimal numbers zero through nine inclusive. The key pad also includes a single and dual channel selecting key for activating either a single digit or a dual digit. A controller responsive to said key pad output provides a control signal in order to select a channel number corresponding to the digit of a first digit key activated under the condition that said single channel selecting key is input, and in order to select a channel number corresponding to the digits firstly activated as the tens digit and secondly activated as the units digit.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
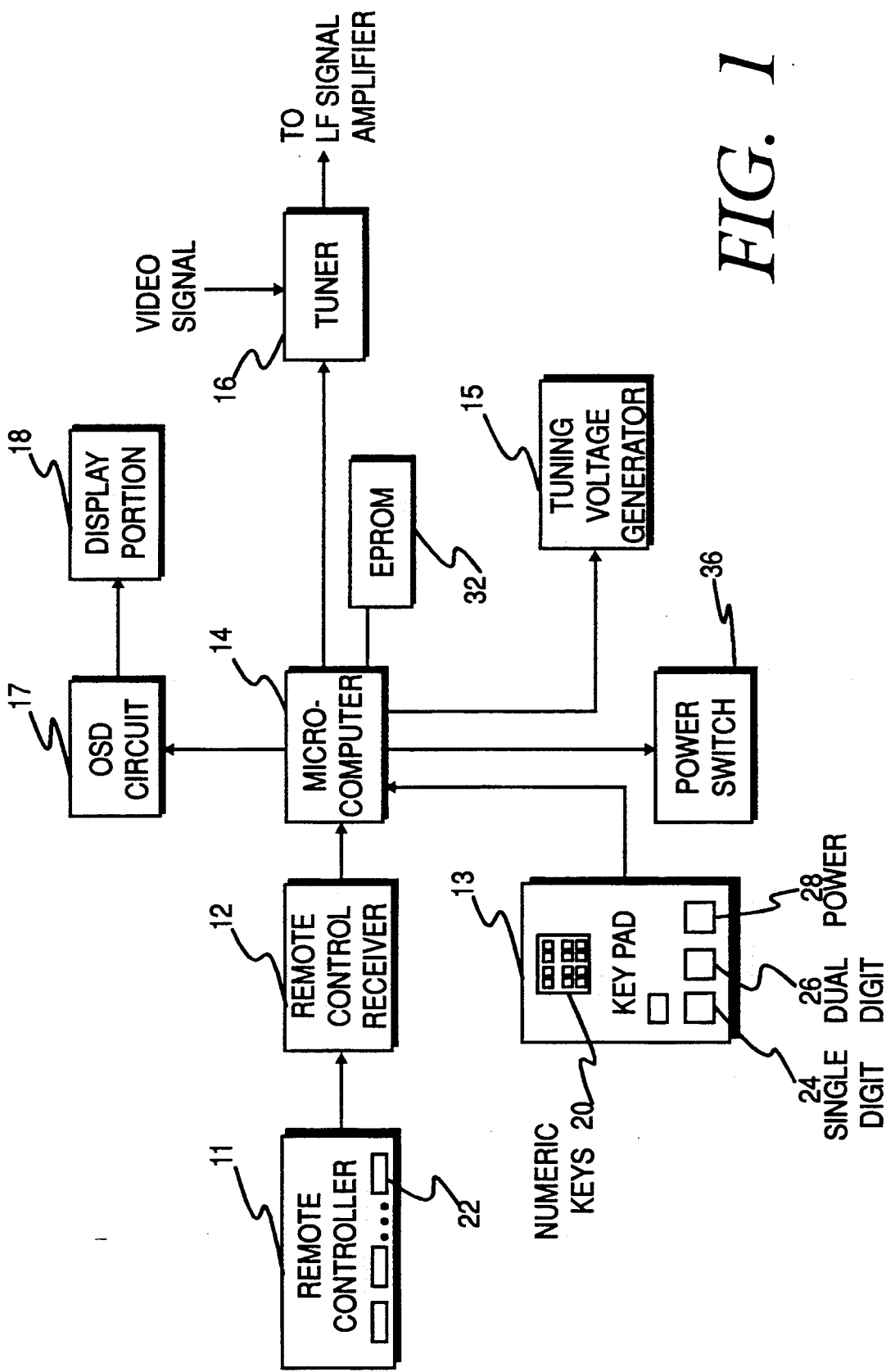
FIG. 1 is schematic block diagram of a channel selecting apparatus constructed according to the principles of the present invention.

Turning now to the drawings, in FIG. 1 a key input device, such as remote controller 11 equipped with a plurality of keys 22 or key pad 13 with at least ten keys 20, each of which s corresponds to one of the decimal numbers zero through nine, inclusive enable a user to control an appliance such as a television set or a video cassette record for example, via the user's manipulation of the keys in order to initiate such functions as turning on or interrupting electrical power to the appliance, and selection of broadcast channels to be received or recorded by the appliance. Remote controller 11 provides its output to microcomputer 14 via remote controller receiver 12. Key pad 13 is connected to provide its output to microcomputer 14.

Microcomputer 14, acting as a controller, is connected to on screen display (OSC) circuit 17 in order to provide to OSD circuit 17 an output control signal which controls operation and functions of circuit 17. Circuit 17 provides character generating signals to a display circuit 18 such as a cathode ray tube of a television receiver capable of providing a visual display, through a video signal processing circuit (not shown), in response to the data signal from OSD circuit 17 and control signals from microcomputer 14.

A tuning voltage generator 15 generates a voltage for adjusting the tuning of tuner 16 in response to a digital signal from microcomputer 14 corresponding to the designated channel number selected by a user via either remote controller 11 or keypad 13. Tuning voltage generator 15 may be either of the voltage synthesis type such as a digital to analog converter, or of the frequency synthesis type such as a frequency or phase locked loop PLL. In the preferred embodiment, generator 15 may be a frequency synthesis type, such as a phase locked loop. Tuner 16 also receives a video broadcast signal from an antenna (not shown) and responds to control signals from microcomputer 14. Application of electrical power to the receiver sufficient to provide a visual display of the selected broadcast video signal on the selected channel designated by the user's activation of selected keys of either controller 11 or key pad 13, occurs when microcomputer 14 applies a control signal to power switch 36 to thereby initiate the "POWER-ON" mode of the television receiver.

Figure 2:
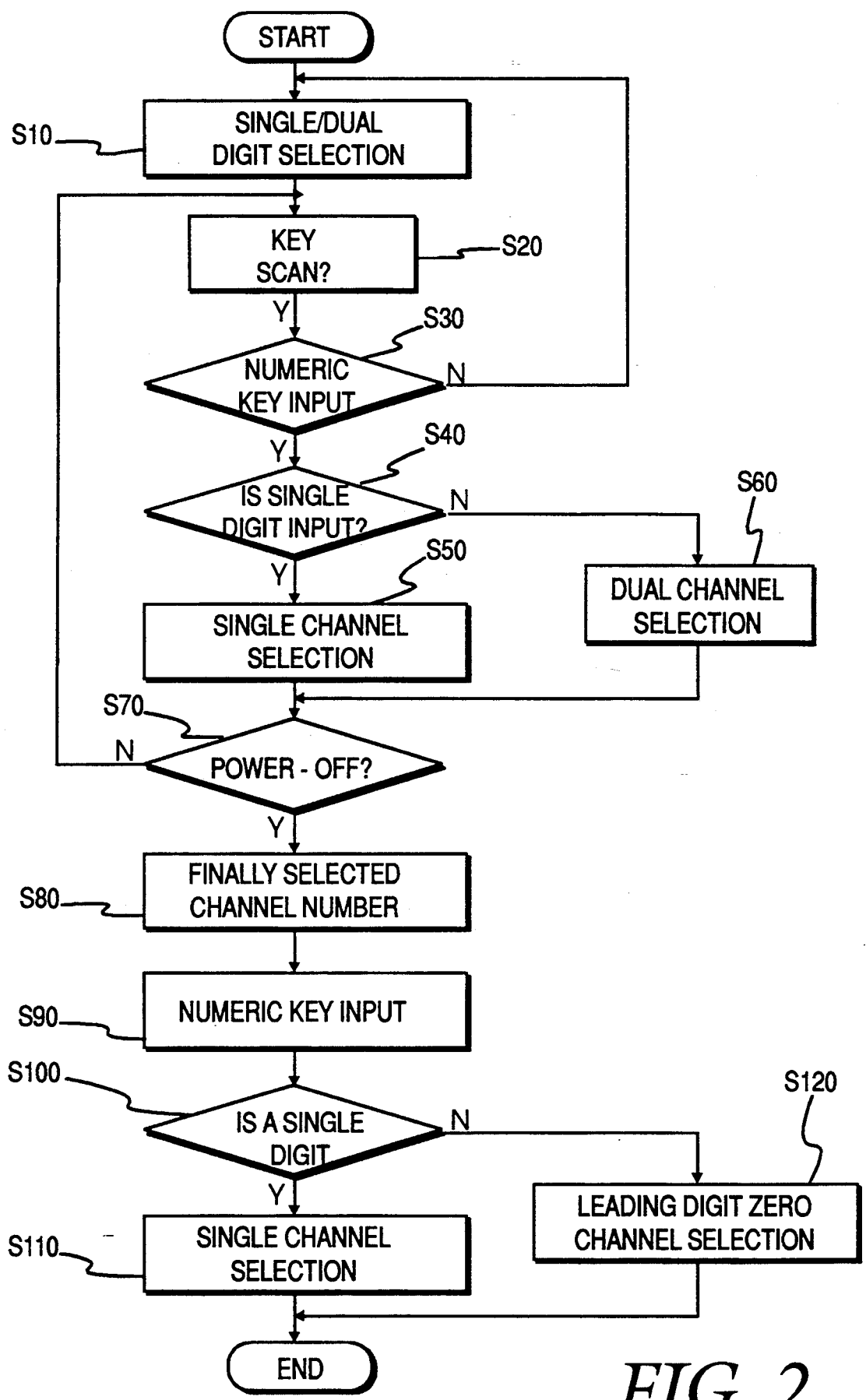
FIG. 2 is a flow chart illustrating a channel selecting process performed according to the principles of the present invention.

An embodiment of a channel selecting process for operating the channel selecting apparatus constructed as stated above is hereinafter described with reference to FIG. 2 through FIG. 4.

In step S10, either a single digit key 24 or the dual digit key 26 is first activated to indicate whether a single digit channel number or a two digit channel number is being entered via controller 11 or key pad 13 in order to enable a user to select the desired channel. For example, if the desired channel number is "3", single digit selecting key 24 should be activated, while if the desired channel number is "45", the dual digit selecting key 26 should be activated. Microcomputer 14 stores this digit information in memory (EPROM) 32 and performs a key scan process (S20). If a numeric key 20 is activated (S30), microcomputer 14 determines whether or not the activated key is a single digit (S40) on the following basis. If the single digit key 20 is pressed under the condition that the single digit selecting key 24 is activated in the foregoing step S10, a channel having a single digit numerical representation is tuned. In step S40, if it is determined that a single digit channel number is not input, a two-digit channel selecting process is performed, which is hereafter described in detail with reference to FIG. 3.

Figure 3:
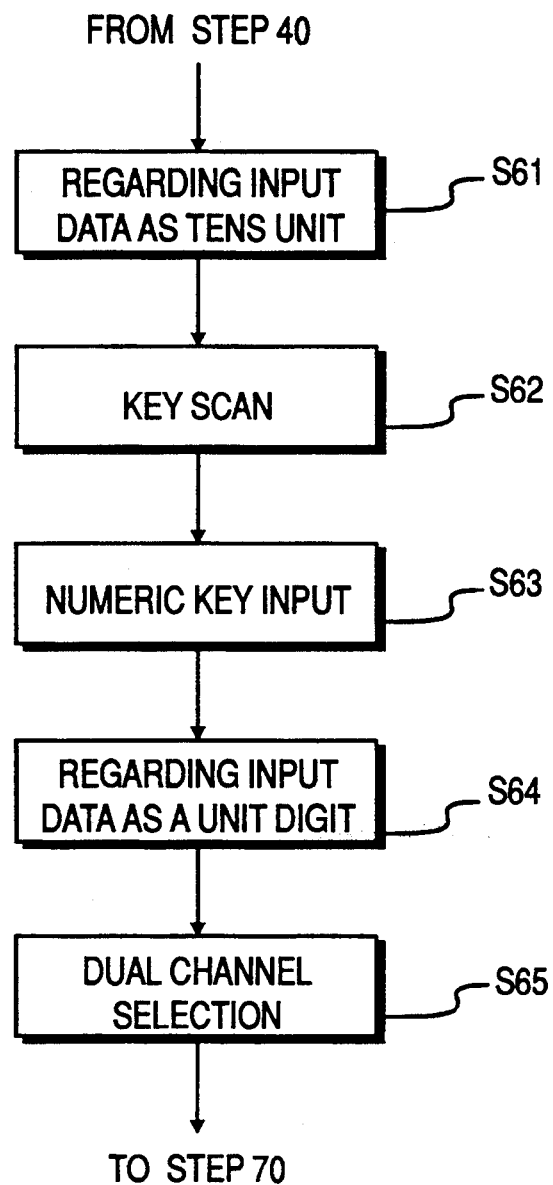
FIG. 3 is a flow chart illustrating a dual channel selecting process incorporated into the routine illustrated by FIG. 2.
Figure 4:
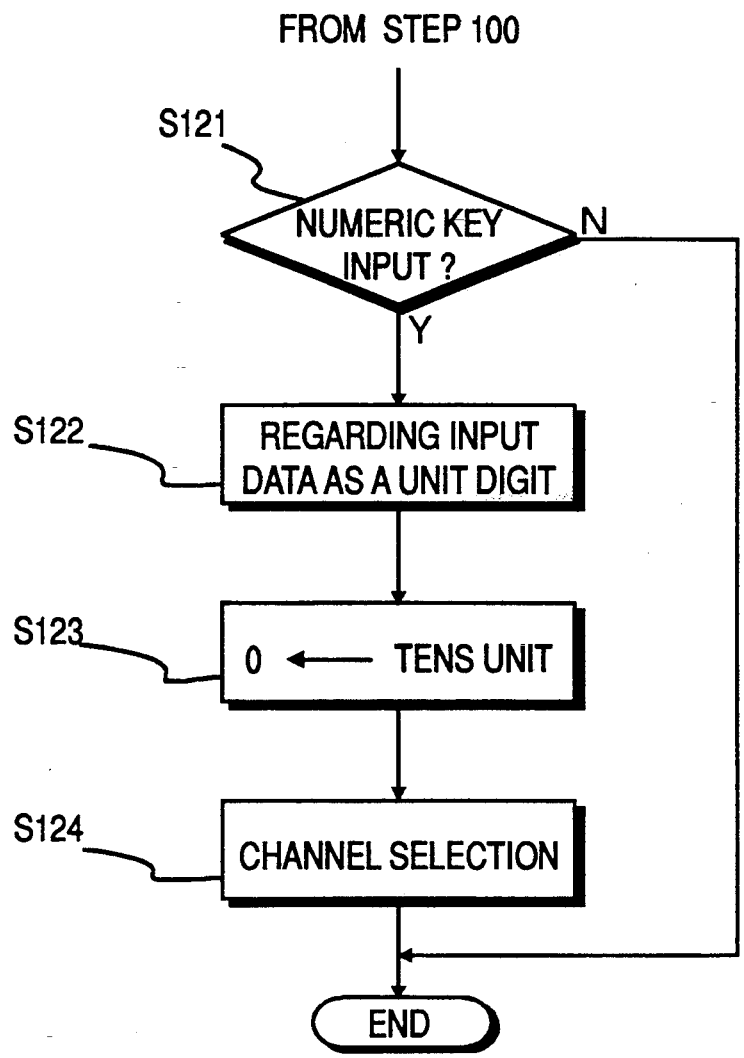
FIG. 4 is a flow chart illustrating a leading zero channel selecting process incorporated into the routine illustrated by FIG. 2.

As is shown in FIG. 3, the channel number corresponding to the first activated key 20 in step 30 is regarded as the tens digit (S61) and the key scan process is successively performed by microcomputer 14 (S62). The second activated key 20 is regarded as a unit digit (steps S63, S64) and a dual channel number is finally selected at step S65 in order to allow the user to watch a television program being broadcast on the channel selected, as is represented by the display shown in FIG. 5C.

As previously described, if the channel selecting process is completed and the program on the desired channel then being broadcast is received via tuner 16, the user may watch that program on television. Subsequently, while watching that program on the television, microcomputer 14 determines whether or not the "POWER-OFF" key is pressed (at step S70). If the "POWER-OFF" key 28 is pressed, microcomputer 14 stores the final channel number, which is finally selected (at step S80). At this time, if any numeric key 20 is activated, microcomputer 14 judges at step S100 whether or not the stored final channel is a single digit. If at step S100 it is determined that a single digit is input, the corresponding channel is tuned as previously described at step S110. If it is determined at step S100 that a single channel number is not input, a leading zero digit channel selecting process is performed, which is hereinafter described by reference to FIG. 4. That is, if at step S121 a determination is made that a channel number key is pressed, the output of the activated channel number key is determined as the unit digit channel and, at step S123, the tens digit channel stored at "POWER-OFF" is replaced by a "0". At step S124, the desired channel is accordingly tuned. For example, if the activated channel number key is "6", the channel corresponding to "06" is tuned as is illustrated in FIG. 5D, which indicates the selected channel number.

Figure 5A:
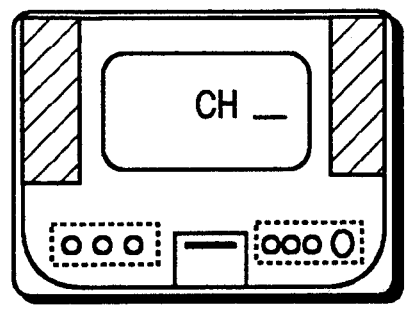
FIGS. 5A, 5B, 5C and 5D show channel number states displayed on a cathode ray tube of a television set resulting from activation of various sets of the numeric keys.
Figure 5B:
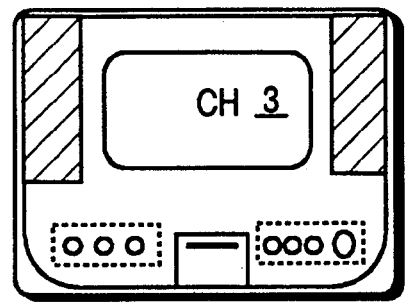
Figure 5C:
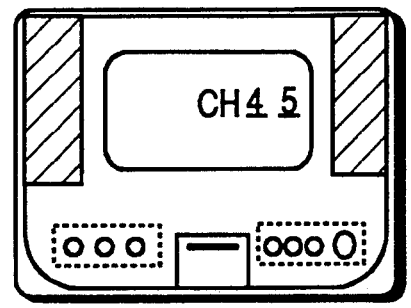
Figure 5D:
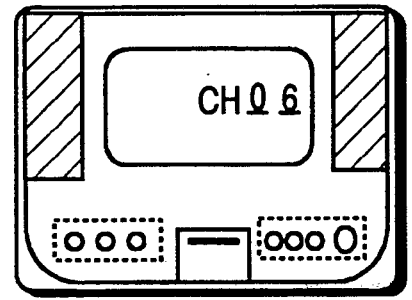

FIGS. 5A through 5D show the channel number displayed on the cathode ray tube of a television set in response to the character signal of OSD circuit. In FIGS. 5A and 5B, the channel number of the single digit channel selecting process as previously described in steps 30, 40 and 50 is illustrated. The channel number of the two-digit channel selecting process as previously described in step 60 is illustrated in FIG. 5C. The channel number of the leading zero digit channel selecting process at step 120 is illustrated in FIG. 5D. Accordingly, with the foregoing embodiment a user may easily select the desired channel, and quickly change the desired channel after watching the channel number displayed on the cathode ray tube.

As explained above, according to the channel selecting system of the present invention, there is no such problem as a loss of viewing time and tedious waiting time during a two-digit channel selecting process. As a consequence, the channel selecting process is convenient for a user to easily and quickly operate the key pad irrespective of a digit number of the channel selected by the user.

While the present invention has been particularly shown and described with reference to particular embodiments thereof, it will be understood by those skilled in the art the various changes in form and detail may be affected therein without departing from the spirit and scope of the invention as defined by the appended claims. The embodiment described in FIG. 1 contemplates both a single digit selecting key 24 and a dual digit selecting key 26; an alternative embodiment of the instant invention may also be practiced using a single selecting key, such as a single/dual digit selecting key. In this alternative embodiment, the activation of the single/dual digit selecting key indicates a user's selection of a single digit channel. Alternatively however, a single/dual digit selecting key may be used according to the principles of the present invention to indicate a user's selection of a two digit channel number.

What is claimed is:

1. A channel selecting apparatus for effectively selecting a desired channel in response to an entered digit signal, said apparatus comprising:
    a key pad having ten keys each corresponding to a different one of decimal numbers zero through nine inclusive, said key pad also including a single/dual channel selecting key for activating one of a single digit mode and a dual digit mode, said key pad providing key pad output in response to activation of said single/dual channel selecting key and selected ones of said ten keys by a user; and
    control means responsive to said key pad output for providing a control signal in order to select a first channel number corresponding to a first activated digit when said single/dual channel selecting key is input to activate said single digit mode, and in order to select a second channel number corresponding to said first activated digit as a ten's digit and a second activated digit as a unit's digit when said single/dual channel selecting key is input to activate said dual digit mode.

2. The apparatus of claim 1, further comprised of said control means being responsive to said key pad output by enabling application of electrical power to an appliance incorporating said apparatus while simultaneously selecting one of said first channel number corresponding to said first activated digit and said second channel number corresponding to said first and second activated digits.

3. A method for selecting a desired channel in a television set by using a microcomputer responsive to inputs from a key pad including at least ten keys representative of decimal numbers zero through nine inclusive, a single digit channel selecting key and a dual digit channel selecting key, said method comprising the steps of:
    determining whether one of said single digit channel selecting key and said dual digit channel selecting key is activated;
    performing a POWER-ON function of the television set and simultaneously selecting from a plurality of broadcast channels receivable by the television set a first broadcast channel corresponding to a single digit channel number if a first digit key is activated when it is determined that said single digit channel selecting key is activated; and
    performing said POWER-ON function of the television set and simultaneously selecting from said plurality of broadcast channels a second broadcast channel corresponding to a dual digit channel number if a second digit key is successively activated after activation of said first digit key when it is determined that said dual channel selecting key is activated.

4. The channel selecting method according to claim 3, wherein said step for selecting said second broadcast channel corresponding to the dual digit channel number comprises the steps of:
    characterizing key data corresponding to said first digit key as a ten's digit;
    entering key data corresponding to said second digit key;
    characterizing said key data corresponding to said second digit key as a unit's digit; and
    selecting said second broadcast channel corresponding to said dual digit channel number, with said dual digit channel number indicated by said first digit key and said second digit key.

5. A channel selecting method of a channel selecting apparatus having a microcomputer for performing a POWER-ON function of a television set while simultaneously selecting a desired channel and a key pad comprising a single/dual digit channel selecting key and at least ten keys corresponding to decimal numbers zero through nine inclusive, said method comprising the steps of:
    entering digit information from said single/dual digit channel selecting key of said key pad into said memory, said digit information indicating whether a number representative of a first selected channel contains a single digit or dual digits;
    selecting said first selected channel in dependence upon said entering step;
    storing a last channel number selected before the television set performs a POWER-OFF function;
    determining whether said last channel number contains only a single digit after entering a second selected channel; and
    selecting said second selected channel in dependence upon said determining step.

6. The method of claim 5, further comprised of selecting said first selected channel in response to any activation of said single/dual digit channel selecting key and a numeric input from said key pad.

7. The channel selecting method according to claim 5, wherein said step of selecting said second selected channel comprises the steps of considering a zero to numerically represent a ten's digit of a number representative of said second selected channel and a first key input to numerically represent a unit's digit of said number representative of said second selected channel when said last channel number is determined not to contain only a single digit.

8. A channel selecting method of a television set using a key pad including at least ten keys corresponding to decimal numbers zero to nine inclusive, a single digit channel selecting key, a dual digit channel selecting key and a microcomputer responsive to output from said key pad, said method comprising the steps of:
    inputting either said single digit channel selecting key or said dual digit channel selecting key in dependence upon whether a first desired channel number contains only a single digit;
    performing a POWER-ON function of said television set and simultaneously selecting said first desired channel number;
    storing a channel number finally selected before said television set performs a POWER-OFF function; and
    performing said POWER-ON function of said television set and simultaneously selecting a second desired channel number in dependence upon whether or not said finally selected channel number contains only a single digit.

9. A channel selecting method of selecting a channel from among a plurality of broadcast channels receivable by an appliance controllable by a key pad comprising ten numerical keys representing decimal numbers zero through nine and a single/dual channel selecting key, comprising:

writing digit information from the key pad into a memory of the appliance, with said digit information depending upon a selected activation of said numerical keys;

making a determination on a basis of activation of said single/dual channel selecting key by a user of whether said digit information corresponds to a single one of said numerical keys; and enabling application of electrical power to the appliance while, in dependence upon said determination, simultaneously tuning the appliance to receive from among said plurality of broadcast channels a broadcast channel corresponding to said selected activation.

10. A channel selecting apparatus for effectively selecting a desired channel, comprising:

programming means comprising a single/dual channel selecting key for generating channel data establishing whether a single digit channel or a two-digit channel is being selected, and ten numerical keys having differently numbered digital values zero through nine inclusive for providing selection data designating a channel number;

controlling means for responding to said channel data by generating a first control signal enabling application of electrical power to the appliance and simultaneously generating a second signal in dependence upon said channel data and said selection data; and tuning means for responding to said second control signal by adjusting a tuning frequency of an appliance to receive a broadcast signal represented by said channel number having a single digit if said selection data corresponds to activation of a single one of said numerical keys, and by adjusting a tuning frequency of the appliance to receive a broadcast signal represented by said channel number having more than one digit if said selection data corresponds to successive activation of more than one of said numerical keys.

11. A method for selecting channels on a television set using a key pad having at least ten keys representative of decimal numbers zero through nine inclusive, a single digit channel selection key and a dual digit channel selection key, said method comprising the steps of:

inputting one of said single digit channel selection key and said dual digit channel selection key in dependence upon a number of digits contained by a first desired channel number;

performing a POWER-ON function of the television set and simultaneously selecting a channel corresponding to said first desired channel number in dependence upon said inputting step;

storing a last channel number selected before the television set performs a POWER-OFF function;

determining whether said last channel number contains only a single digit after entering a second desired channel number; and performing said POWER-ON function of the television set and simultaneously selecting a channel corresponding to said second desired channel number in dependence upon said determining step.

12. The method as claimed in claim 11, wherein said step of selecting said channel corresponding to said first desired channel number further comprises the step of considering a first key input to numerically represent a ten's digit of said first desired channel number and a second key input to numerically represent a unit's digit of said first desired channel number when said dual digit channel selection key is input in said inputting step.

13. The method as claimed in claim 12, wherein said step of selecting said channel corresponding to said first desired channel number further comprises the step of considering said first key input to numerically represent said first desired channel number when said single digit channel selection key is input in said inputting step.

14. The method as claimed in claim 11, wherein said step of selecting said channel corresponding to said second desired channel number further comprises the step of considering a zero to numerically represent a ten's digit of said second desired channel number and a first key input to numerically represent a unit's digit of said second desired channel number when said last channel number is determined not to contain only a single digit.

15. The method as claimed in claim 14, wherein said step of selecting said channel corresponding to said second desired channel number further comprises the step of considering said first key input to numerically represent said second desired channel number when said last channel number is determined to contain only a single digit.

* * * * *